UNITED STATES PATENT OFFICE.

HENDRIK BEINS, OF GRONINGEN, NETHERLANDS.

IMPROVEMENT IN THE MANUFACTURE OF LIQUID CARBONIC ACID.

Specification forming part of Letters Patent No. 152,269, dated June 23, 1874; reissue No. 6,220, dated January 12, 1875; application filed November 18, 1874.

*To all whom it may concern:*

Be it known that I, Dr. HENDRIK BEINS, of Groningen, in the Kingdom of the Netherlands, have invented a new and Improved Method of Manufacturing Carbonic Acid of any desired tension, and applying the same in a compressed state to different purposes, of which the following is a full and exact description:

The object of my invention is the manufacture of carbonic acid by heating carbonate of lime in a closed retort of any convenient material, and then conducting the produced gas through a pipe, under pressure, into a more or less refrigerated reservoir, in which the carbonic-acid gas is collected in a compressed state. The retort, having been filled with the carbonate of lime, is tightly closed, and only one or more holes left open, through which the carbonic-acid gas ($CO_2$) can escape. This material being heated to a light white heat, the development of the gas begins immediately, and is continued until all $CO_2$ is disengaged. This is effected under a low pressure, and there remains in the retort nothing but caustic lime, which is of a very good quality, even if only made of oyster-shells. When slaked it is perfectly white, soft, and fatty, and free of ashes. Such a furnace and retort consumes less fuel, and furnishes a lime superior to that produced by ordinary lime-furnaces.

To work with the lowest possible temperature, the carbonic-acid gas must be conducted out of the retort by a negative pressure—that is to say, drawn out by suction. The carbonic-acid gas can be disengaged from the carbonate of lime at a low pressure by refrigerating the reservoir, thus saving a great amount of fuel, while the retorts will not be worn out so quickly, and all the gas which otherwise would have penetrated the red-hot walls of the retort will be saved.

The vacuum produced in the retort by this suction is not great enough that the gases of the fire can penetrate into the retort. The motive power necessary to produce this vacuum can easily be obtained, at a trifling cost, by the employment of bicarbonate of soda, as will be explained hereafter, and which same source furnishes us also the motive power to drive ventilators, which can replace the chimneys of such furnaces. The lime, when taken from the retort, is in a red-hot state, which said heat may be used, in connection with the bicarbonate of soda, to produce the motive power required for exhausters and ventilators of the furnaces above mentioned.

This method of producing carbonic-acid gas can also be effected in an easy way by taking an ordinary gas-pipe of three or four inches in diameter, and about three feet in length, closed at one end, and filled with carbonate of lime or any other carbonate. The other end is then closed by a wooden plug, perforated, to which a pipe of india-rubber is attached, whose other end is submerged in a reservoir of lime-water. The pipe containing the carbonate of lime is then heated in a furnace or forge, when the carbonic-acid gas is continuously disengaged into the lime-water. This development of the gas is effected in a short time, and the remaining lime is completely calcined, and can easily be slaked. The carbonic-acid gas obtained in this manner is, for all ordinary purposes, sufficiently pure to bicarbonate the ordinary soda-salt. It may, perhaps, contain a small quantity of fire-gases, which is observed by its odor; but this is no inconvenience for all ordinary uses.

The disengaged carbonic-acid gas contains some carbonic oxide, (CO,) the carbonate employed being always mixed with organic substances. When iron retorts are employed, carbonate of iron is often produced, principally during the first part of the work. Afterward the retorts are covered on the inside with a coating of silicate, and they are glazed if made of clay.

In special cases the carbonic-acid gas obtained may be washed in any convenient manner, and even absorbed by carbonate of soda, from which it can be reobtained completely pure by heating the mass. By this method carbonic-acid gas is obtained at a very moderate price, the cost of manufacture being mostly covered by the value of the caustic lime, which is obtained at the same time.

In the same way bicarbonate of soda can be manufactured. Ammonia, common salt, and a surplus of carbonic-acid gas, mixed together in certain proportions, furnish bicarbonate of soda and sal-ammoniac, which is of little value, but mixed with lime or magnesia and heated, the ammonia is restored. The chloride of calcium or chloride of magnesium produced is worked and employed in the ordinary way.

This pure bicarbonate of soda obtained by my method, or the common bicarbonate of of soda as it is in the trade, if sufficiently heated in closed vessels, will be decomposed into carbonate of soda and free carbonic-acid gas of any desired tension. I have found that this tension increases regularly, though rather rapidly, with the temperature, so that more or less heating will give a corresponding tension. The temperature of boiling water corresponds to a pressure of from three to four atmospheres, whereas a heat of 570° to 750° Fahrenheit gives a gas of the very high tension of from fifty to sixty atmospheres, and even more.

If the gas of that high tension and temperature is conducted into a refrigerated reservoir, which is kept at about 60° Fahrenheit, it is condensed under that pressure into a liquid state of 0.8 specific gravity, and transparent as crystal.

If the refrigerating-reservoir is cooled down to 32° Fahrenheit the pressure of the carbonic acid is reduced, and will only be thirty-seven and a half atmospheres, namely, the same under which the carbonic-acid gas is liquefied. Therefore carbonic acid, even in the state of carbonic-acid gas, may be had of any desired tension, and be used for numerous industrial purposes.

To make my invention clearer, and to be better understood, I will now describe, as an example, a very simple construction of an apparatus to produce fluid carbonic acid of very high tension. I take a wrought-iron pipe, open at one end, which open end extends beyond the fire, and heat the same. Through this open end I introduce a convenient iron box containing bicarbonate of soda, and then close the opening by a screw fitted with a lead or babbitt-metal washer, upon which a small stream of water is made to flow to keep the same cool. The development of the gas begins immediately the proper amount of heat is obtained, which gas is conducted, through a pipe soldered to the open end of the retort-pipe, to a receiver furnished with a glass gage and a manometer. The receiver must not be completely filled, as the liquefied carbonic-acid gas is in an extreme degree expansive when heated, and might cause the apparatus to burst without this precaution. This receiver must always be kept cool, and it is, therefore, advantageous to remove the same as far as possible from the fire-place and retort. To effect this in the most convenient manner, and remove the heat from the gas better, I prefer to make this receiver to consist of a series of small reservoirs, which offer a greater cooling-surface, are at the same time stronger, and in proportion not so heavy as one large receiver. For small trials or experiments I take simply a strong glass pipe or receiver. This pipe is somewhat warmed, and joined to the iron retort by means of ordinary sealing-wax.

The apparatus being constructed in the above-described manner, and the conducting-pipes sufficiently cooled, the fire is brought to 570° to 750° Fahrenheit, when the fluid carbonic acid will flow down into the receiver like water, and may readily be seen increasing, it being much clearer than the water. Bicarbonates thus used are distilled in a few minutes. The third part of the volume, or one quarter of the weight of the pulverized bicarbonate, being distilled into fluid carbonic acid, the cock is closed, and the charge of bicarbonate in the retort renewed. In this manner it may be continued until the desired quantity of carbonic acid is obtained.

The above fact is of the greatest importance for the many useful applications that can be made of it in industry. First of all, carbonic acid furnishes us a very cheap motor for great and small industries, which I think will soon supersede steam, water, air, or any other known motive power.

From nine hundred and eighty to nine hundred and ninety cubic inches of fluid carbonic acid, or 227.33 cubic feet of carbonic-acid gas, at atmospheric pressure, are required for each horse-power per hour. The specific gravity of a cubic foot of gas being 0.123 pounds, we get in round numbers, as a mean, twenty-eight pounds weight for the 227.33 cubic feet of gas. Bicarbonates contain gas to one-quarter of their weight, and we require, therefore, four times twenty-eight, or one hundred and twelve, pounds of bicarbonate for each horse-power per hour.

The great evaporating power of the fluid carbonic acid makes it very applicable for the manufacture of ice, soda and mineral waters, and sparkling wines, for which it furnishes the cheapest and purest gas.

The above-described method, and the very high or varying tensions of the carbonic acid, can be easily applied in laboratories for scientific and other useful purposes. The raw material from which this excellent product can be produced is easily obtained nearly everywhere in almost unlimited quantity.

By experience I have found that reservoirs of various materials, such as hammered copper, cast-steel, glass, &c., are completely impenetrable by the gases of that tension, and that ordinary cocks, well ground, are sufficient to keep the gas in the reservoirs; but I employ in preference, if the gas shall be kept a long time, such as for days or weeks, a cock of a peculiar construction, by being provided with a screwed cover, packed with a lead or babbitt-metal washer. The union-screws, which must be unscrewed before and afterward, are also furnished with lead or babbitt-metal washers, to form a hermetic joint by closing tighter by expansion when heated; but the heat should not be much higher than boiling water; otherwise the lead will become too soft to resist the pressure of the gas. In such cases, and also to keep the cocks tight, I apply a continuous stream of cold water, which gives perfect satisfaction.

What I claim as my invention, and desire to secure by Letters Patent, is—

The within-described process for manufacturing carbonic-acid gas and liquefied carbonic-acid gas of any desired tension and temperature, by heating bicarbonate of soda or other bicarbonates in a closed vessel or retort, and conducting the escaping gases through a pipe into a refrigerated reservoir, substantially as hereinbefore described.

HENDRIK BEINS.

Witnesses:
M. HOEN,
K. BOEREMA.